(12) United States Patent
Weber et al.

(10) Patent No.: US 11,099,394 B2
(45) Date of Patent: Aug. 24, 2021

(54) SYSTEMS, DEVICES, AND METHODS FOR ALIGNING A DIFFRACTIVE ELEMENT IN A WEARABLE HEADS-UP DISPLAY

(71) Applicant: GOOGLE LLC, Mountain View, CA (US)

(72) Inventors: Arnett Weber, Waterloo (CA); Darren Ihmels, Toronto (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/742,467

(22) Filed: Jan. 14, 2020

(65) Prior Publication Data

US 2020/0271935 A1 Aug. 27, 2020

Related U.S. Application Data

(60) Provisional application No. 62/810,569, filed on Feb. 26, 2019.

(51) Int. Cl.
*G02B 27/01* (2006.01)
*G02B 27/09* (2006.01)
*G02B 27/32* (2006.01)

(52) U.S. Cl.
CPC ..... *G02B 27/0172* (2013.01); *G02B 27/0176* (2013.01); *G02B 27/0944* (2013.01); *G02B 27/0955* (2013.01); *G02B 27/32* (2013.01); *G02B 2027/0178* (2013.01)

(58) Field of Classification Search
CPC ............ G02B 27/0172; G02B 27/0176; G02B 27/32; G02B 27/0955; G02B 27/0944; G02B 2027/0178; G02B 27/1086; G02B 27/4272; G02B 2027/0174
See application file for complete search history.

(56) References Cited

U.S. PATENT DOCUMENTS

| | | | |
|---|---|---|---|
| 9,632,312 B1* | 4/2017 | Cakmakci | G02B 5/1852 |
| 2016/0187654 A1* | 6/2016 | Border | G02B 5/18 359/567 |
| 2016/0198949 A1* | 7/2016 | Spitzer | G02B 27/0093 351/204 |
| 2018/0045964 A1* | 2/2018 | Jones | G06F 1/163 |
| 2018/0096503 A1* | 4/2018 | Kaehler | G02B 27/0172 |

\* cited by examiner

*Primary Examiner* — Andrew Sasinowski

(57) ABSTRACT

Systems, devices, and methods for aligning a diffractive element in a wearable heads-up display ("WHUD") are described. A WHUD that includes a projector, a transparent combiner, a WHUD frame, and a diffractive optical element (DOE) embedded in the transparent combiner, requires alignment between the DOE and the eye of the user and/or the projector. A WHUD includes a DOE aligned with an eye of a user when the WHUD is worn on the head of the user. A method of aligning a DOE in a WHUD with an eye of a user when the WHUD is worn on a head of a user includes aligning a first part of the WHUD frame with a first part of the face of the user, and aligning the DOE with a second part of the WHUD frame.

19 Claims, 9 Drawing Sheets

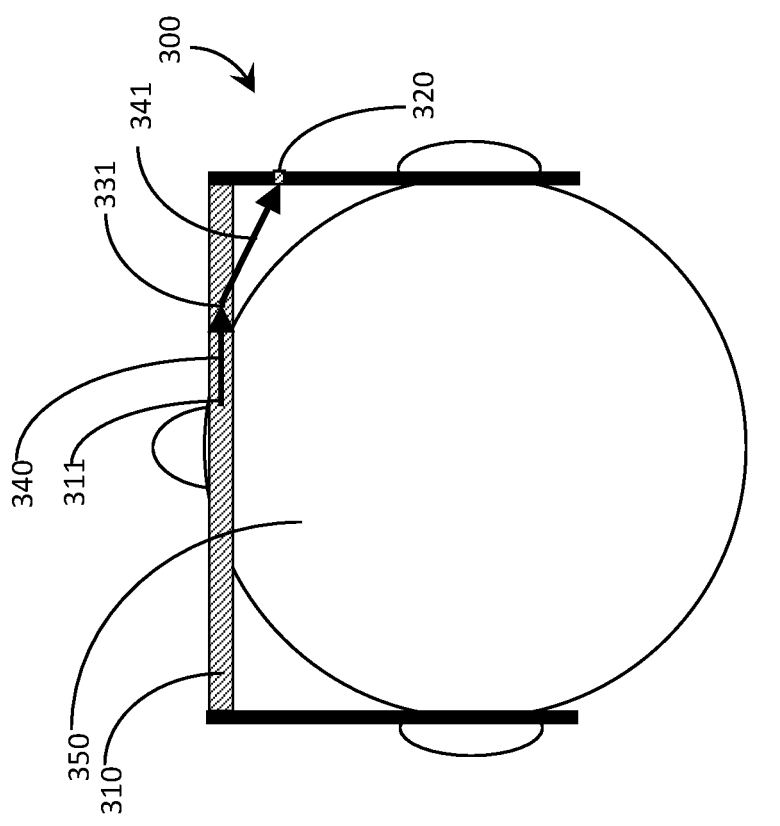
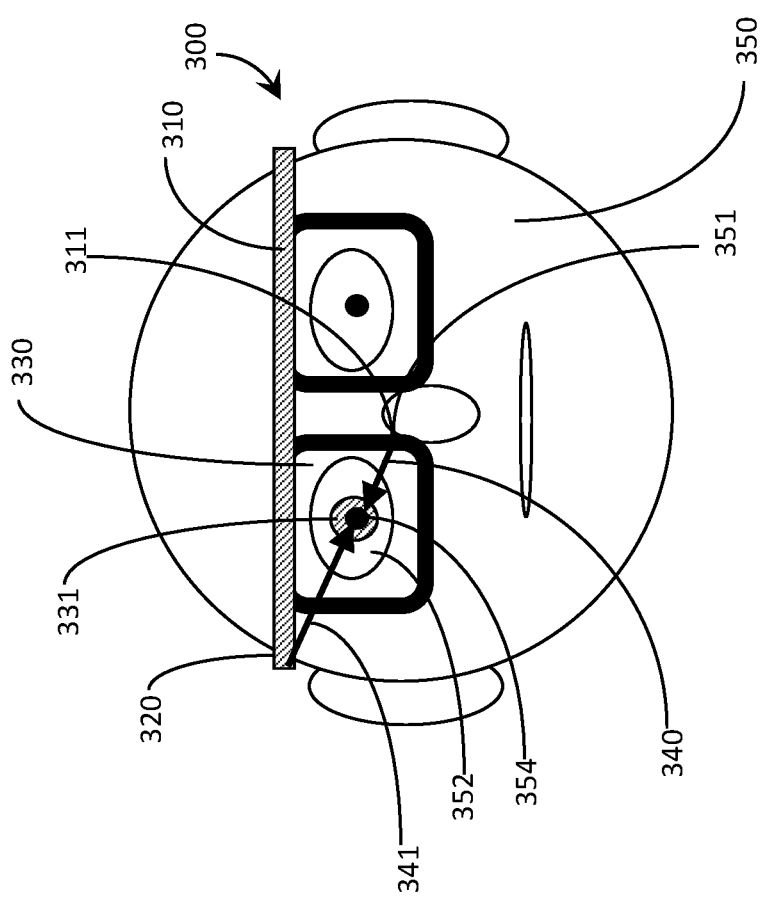
FIGURE 3D
FIGURE 3C

SYSTEMS, DEVICES, AND METHODS FOR ALIGNING A DIFFRACTIVE ELEMENT IN A WEARABLE HEADS-UP DISPLAY

CROSS REFERENCE TO RELATED APPLICATION

This application claims the benefit of U.S. Provisional Application No. 62/810,569, filed 26 Feb. 2019, titled "Systems, devices, and Methods for aligning a diffractive element in a wearable heads-up display", the content of which is incorporated herein in its entirety by reference.

TECHNICAL FIELD

The present systems, devices, and methods generally relate to wearable heads-up displays and particularly relate to aligning diffractive optical elements in laser projectors.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a pattern of laser light and usually at least one controllable mirror is used to spatially distribute the modulated pattern of laser light over a two-dimensional area of another object. The spatial distribution of the modulated pattern of laser light produces an image at or on the other object. In conventional laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

BRIEF SUMMARY

A wearable heads-up display ("WHUD") custom fitted for a user, the user having head having a face, an eye with a pupil, and a first specified part of the face spaced from the pupil, and characterized by an inner pupillary distance ("IPD") that is a vector distance between the pupil of the eye of the user and the first specified part of the face of the user, may be summarized as including: a support structure; a projector carried by the support structure; and a transparent combiner positioned and oriented with respect to the support structure to appear in a field of view of an eye of a user when the support structure is worn on a head of the user, the transparent combiner comprising: a lens carried by the support structure; and a diffractive optical element ("DOE") positioned within the lens to align the DOE with the eye of the user when the support structure is worn on a head of the user.

The support structure may have a first part; and a distance between the DOE and the first part of the support structure may include the IPD. The first part of the support structure may be a portion of the support structure that contacts the first specified part of the face of the user when the support structure is worn on the head of the user.

The support structure may have a second part, the second part different from the first part of the support structure; the lens may have a first part, the first part of the lens physically coupled to the second part of the support structure; and a sum of a vector distance from the first part of the support structure to the second part of the support structure, and a vector distance from the first part of the lens to the DOE, may be equal to the IPD.

A vector distance between the projector and the DOE may characterize an outer pupillary distance ("OPD"); the support structure may have a third part; the lens may have a second part, the second part of the lens physically coupled to the third part of the support structure; and a sum of a vector distance from the DOE to the second part of the lens, and a vector distance from the third part of the support structure to the projector, may be equal to the IPD.

A method to align a diffractive optical element ("DOE") within a wearable heads-up display (WHUD) with an eye of a user when the WHUD is worn on a head of a user, may be summarized as including: aligning a first part of the WHUD frame with a first part of a face of the user; and aligning the DOE with a second part of the WHUD frame.

The method may include: determining an inner pupillary distance (IPD), the IPD being a vector distance between the eye of the user and the first part of the face of the user; and determining an outer pupillary distance (OPD), the OPD being a vector distance between a projector and the eye of the user; wherein aligning a first part of a WHUD frame with a first part of a face of the user and aligning the DOE with a second part of the WHUD frame cause the distance between the DOE and the first part of the WHUD frame to be equal to the IPD; and wherein aligning the DOE with the second part of the WHUD frame may include aligning the DOE with the projector, wherein the projector may be physically coupled to the WHUD frame, and wherein aligning the DOE with the projector causes the distance between the DOE and the projector to be equal to the OPD.

The method may include: providing a WHUD frame selected from a group of WHUD frames, wherein each WHUD frame may have a different IPD than each other WHUD frame, and wherein aligning a first part of a WHUD frame with a first part of a face of a user may include aligning a first part of the provided WHUD frame with the first part of the face of the user. Each WHUD frame in the group of WHUD frames may have the same OPD as each other WHUD frame in the group of WHUD frames, and aligning the DOE with the second part of the WHUD frame may include aligning the DOE with the second part of the provided WHUD frame.

The group of WHUD frames may include at least two sub-groups; each WHUD frame in each sub-group may have the same OPD as each other WHUD frame in the same sub-group; the OPD of the WHUD frames in each sub-group may be different from the OPD of the WHUD frames in each other sub-group; providing a WHUD frame selected from a group of WHUD frames may include providing a WHUD frame selected from one of the at least two sub-groups; and aligning the DOE with the second part of the WHUD frame may include aligning the DOE with the second part of the provided WHUD frame.

The WHUD may include an eyeglass lens and a projector, the DOE may be embedded within an internal volume of the eyeglass lens, and aligning a DOE with a second part of the WHUD frame may include compensating for the deviation in the optical path between the eye of the user and the DOE due to the curvature of the eyeglass lens.

Aligning the DOE with a second part of the WHUD frame may include compensating for the deviation in the optical path between the projector and the DOE due to a curvature of the eyeglass lens. Aligning the DOE with a second part of the WHUD frame may include: edging a lens blank to form an eyeglass lens, the lens blank may include the DOE, and the eyeglass lens may include the DOE, a first lens edge, and a second lens edge; physically coupling the first lens edge to a third part of the WHUD frame; and physically coupling the second lens edge to a fourth part of the WHUD frame. Edging a lens blank to form an eyeglass lens may include applying at least one temporary fiducial mark to the lens blank. Applying at least one temporary fiducial mark to the lens blank may include laser-etching the lens blank. Applying at least on temporary fiducial mark to the lens blank may include printing at least one fiducial mark onto the lens blank.

The method may include determining at least one fiducial offset for the at least one fiducial mark. Determining at least one fiducial offset may include measuring a playback of the DOE. Determining at least one fiducial offset may include determining at least one fiducial offset selected from a group consisting of: a lateral offset in a first dimension, a lateral offset in a second dimension perpendicular to the first dimension, a lateral offset in a third dimension perpendicular to the first dimension and perpendicular to the second dimension, an angular offset around a first axis wherein the first axis may be aligned along the first dimension, an angular offset around a second axis wherein the second axis may be aligned along the second dimension perpendicular to the first dimension, and an angular offset around a third axis wherein the third axis may be aligned along the third dimension perpendicular to the first dimension and perpendicular to the second dimension Edging a lens blank to form an eyeglass lens may include edging the lens blank to form a prescription lens. Edging the lens blank to form a prescription lens may include edging the lens blank to align an optical center of the prescription lens with the second part of the WHUD frame. Edging the lens blank to align an optical center of the prescription lens with the second part of the WHUD frame may include adding a planar optical power to the optical power of the prescription lens. Edging the lens blank to align an optical center of the prescription lens with the second part of the WHUD frame may include aligning the prescription lens in the Z direction. Edging a lens blank to form an eyeglass lens may include: blocking the lens blank, and determining a blocking offset.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 3C is a front elevational view of WHUD as worn on the head of a user in accordance with the present systems, devices, and methods.

FIG. 3D is a top elevational view of WHUD as worn on the head of a user in accordance with the present systems, devices, and methods.

DETAILED DESCRIPTION

Figure 1A:
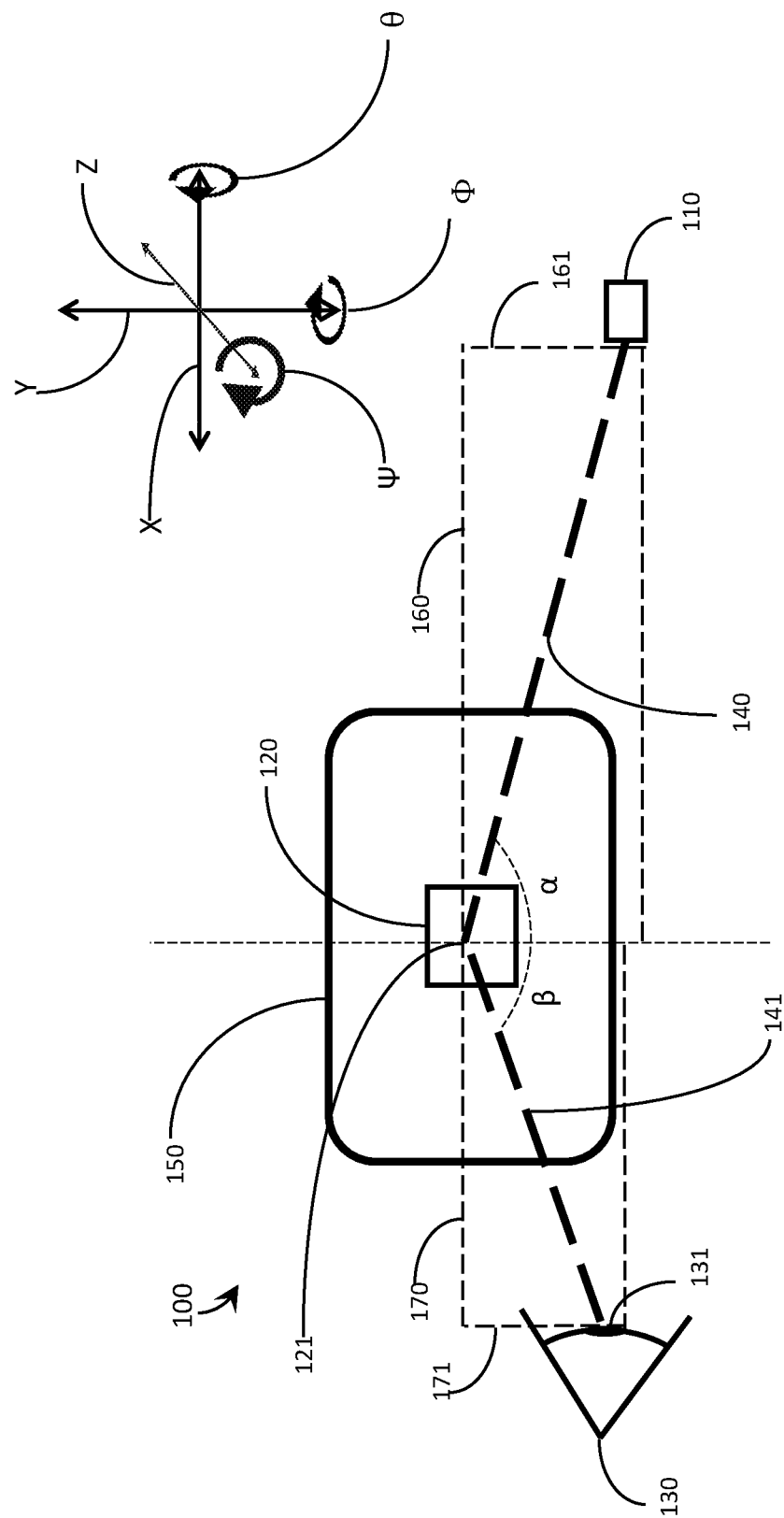
FIG. 1A is a front elevational view of a projector based display positioned relative to an eye in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for aligning a diffractive element in a wearable heads-up display and are particularly well-suited for use in wearable heads-up displays (WHUDS).

A laser projector may produce an image that is visible to a user by projecting a pattern of light onto a non-user object such as a screen, a wall, or similar surface. The image formed by the pattern of light may then be viewed by the user by the process of having the viewer look at the non-user object to view the image formed on the non-user object. In the alternative, a laser projector may produce an image that is visible to the user by projecting a pattern of light onto the retina of the eye of the user; in this case the projector forms part of a virtual retina display (VRD).

Alternative projector technologies include microdisplays, digital light processing (DLP) projectors, Liquid Crystal Display (LCD) projectors, and Liquid Crystal on Silicon (LCoS) projectors.

Manufacture of a wearable heads-up displays may include projector alignment, where the projector is aligned with the display element (hologram, light guide, etc.) of the wearable heads-up display to ensure that the image formed by the laser projector is visible to the user at a desired location within the field of view of the user. Laser projectors may contain more than one laser light source to allow full-color images to be displayed by the projector, where each laser light source projects a portion of an image and the combined light of all laser light sources forms a single image. A full-color laser projector typically contains a red, a green, and a blue laser light source. Each laser light source in the laser projector needs to be aligned with the display element of the wearable heads-up display and must also be aligned with each other laser light source within the projector to ensure that the projector forms a single image, rather than multiple overlapping images.

The projector light must pass through the pupil of the eye of the user in order to reach the retina of the eye of the user, which may be achieved with projector light that originates (or appears to originate) within the field of view (FOV) of the eye of the user. The projector light may be directed through the pupil of the eye of the user by mounting the projector itself within the FOV of the eye of the user, or by redirecting the projector light via an optical element within the FOV of the eye of the user. Said optical element may obstruct at least a portion of the FOV of the eye of the user, as in the case of Google Glass®. In the alternative, projector light may be directed through the pupil of the eye of the user via a transparent combiner where the transparent combiner redirects at least a portion of the projector light into through the pupil of the eye of the user while allowing environmental light to pass through the transparent combiner and also be visible to the eye of the user. Typically, a transparent combiner includes a diffractive optical element (DOE). Non-exclusive examples of transparent combiners include holographic combiners and light guides employing DOEs as coupling elements.

A VRD employing a transparent combiner is advantageous as it allows the user to see the image produced by the projector without necessarily obstructing the field of view of the user, however the transparent combiner typically requires careful alignment of the DOE(s) in order for the projector to successfully direct light onto the retina of the eye of the user.

In a first example, a holographic transparent combiner is very sensitive to the angle and position at which projector light impinges on the holographic transparent combiner. Holographic transparent combiners are only able to redirect light that satisfies the Bragg condition for angle for at least one of the holograms within the holographic combiner; typical holographic transparent combiners have a very narrow range of angles that satisfy the Bragg condition. A small mis-alignment of the hologram may cause a large change in the apparent position of the projected image.

The range of angles and/or positions over which a user of a WHUD is able to direct their gaze and still be capable of viewing the display generated by the WHUD is referred to as the eyebox of the display. The range of angles over which the holographic transparent combiner is able to direct light is typically small; in other words holographic transparent combiners typically have a small eyebox. If the holographic transparent combiner is not carefully aligned with the pupil of the user, the eye of the user may be outside of the eyebox of the display and the WHUD display will not be visible to the user. Therefore, careful alignment of the holographic transparent combiner with the pupil of the eye of the user is necessary. The sensitivity of hologram mis-alignment further increases for multi-laser projectors due to wavelength-dependent angular shifts in hologram playback causing the separate laser images to fail to overlap.

In a second example, a transparent combiner comprising a light guide is very sensitive to the angle at which projector light impinges on the light guide. A light guide based transparent combiner typically operates by incoupling projector light into the light guide with an incoupler, propagating the projector light through the light guide, and then outcoupling the light from the light guide into the eye of the user with an outcoupler. The incoupler and the outcoupler in a typical light guide comprise DOEs; throughout this specification and the appended claims, the terms "in-coupler" and "out-coupler" are generally used to refer to any type of optical grating structure, including without limitation: diffraction gratings, holograms, holographic optical elements (e.g., optical elements employing one or more holograms), volume diffraction gratings, volume holograms, surface relief diffraction gratings, and/or surface relief holograms.

Incoupling, propagation, and outcoupling of projector light are all strongly affected by the angle at which projector light impinges on the light guide; even a small mis-alignment of the incoupler may cause failure of incoupling, propagation, or outcoupling. The above-mentioned increase in sensitivity for multi-laser projectors is further increased in light guides due to the propagation of the laser light through the light guide. Careful alignment of the incoupler with the projector is therefore important to ensure the functioning of the light guide based WHUD. The eyebox of a light guide based WHUD is typically larger than the eyebox of a holographic transparent combiner, however proper alignment of the outcoupler of the light guide based WHUD with the pupil of the eye of the user is advantageous to ensure the widest available FOV for the user.

A typical wearable heads-up display (WHUD) may comprise a support structure that (while in use) is worn on a head of a user, a transparent combiner carried by the support structure, and a projector carried by the support structure. Alignment of the DOE in a WHUD may be defined as fixing the position of the DOE within the transparent combiner at a distance and at an angle relative to the projector to direct projector light into the eye of the user. DOE alignment may include fixing the location of the transparent combiner at a distance and at an angle relative to the pupil of the eye of the user.

Typical manufacturing processes for positioning the DOE within the transparent combiner are inherently imprecise and assembly of the transparent combiner within the support structure will typically result in mis-alignment of the DOE. There is a need in the art for a process to precisely align a DOE within a WHUD to allow the projector to direct light into the eye of the user. FIG. 1A is a front elevational view of a projector based display 100 in accordance with the present systems, devices, and methods. Projector based display 100 comprises projector 110, DOE 120, and is position (in use) relative to an eye 130 of a user. DOE 120 is embedded within a volume of transparent combiner 121. The eye 130 of the user comprises pupil 131.

Projector 110 generates projector light 140. Projector light 140 impinges on DOE 120 at DOE center 121 at an angle α. DOE 120 redirects projector light 140 to form redirected light 141 at an angle β. FIG. 1A is oriented in the XY plane, therefore angle α and angle β are the angle of projector light 140 and redirected light 141, respectively, in the XY plane. DOE 120 may comprise a holographic optical element ("HOE"), in which case DOE 120 redirects light by diffracting projector light 140 to form redirected light 141 and redirected light 141 exits DOE 120 at a point at least approximately overlapping the area of DOE 120 impinged upon by projector light 140.

DOE 120 may comprise an incoupler to a light guide and/or an outcoupler to a light guide, in which case DOE 120 incouples projector light 140 into a light guide. The incoupled light propagates through said light guide until the incoupled light reaches the outcoupler; the outcoupler redirects the incoupled light to form redirected beam 141. Typically, the location of the outcoupler is separated from the location of the incoupler within transparent combiner 121, so the location at which redirected light 141 exits DOE 120 will be separated in space from the location at which projector light 140 impinges upon DOE 120.

Redirected light 141 enters pupil 131 of eye of the user 130, rendering the display visible to eye 130 of the user. In other words, eye 130 of the user is within the eyebox of projector based display 100.

Projector 110 is located at a distance 160 in the X dimension from DOE center 121. Projector 110 is located at a distance 161 in the Y dimension from DOE center 121. Pupil 131 is located at a distance 170 in the X dimension from DOE center 121. Pupil 131 is located at a distance 171 in the Y dimension from DOE center 121.

Figure 1B:
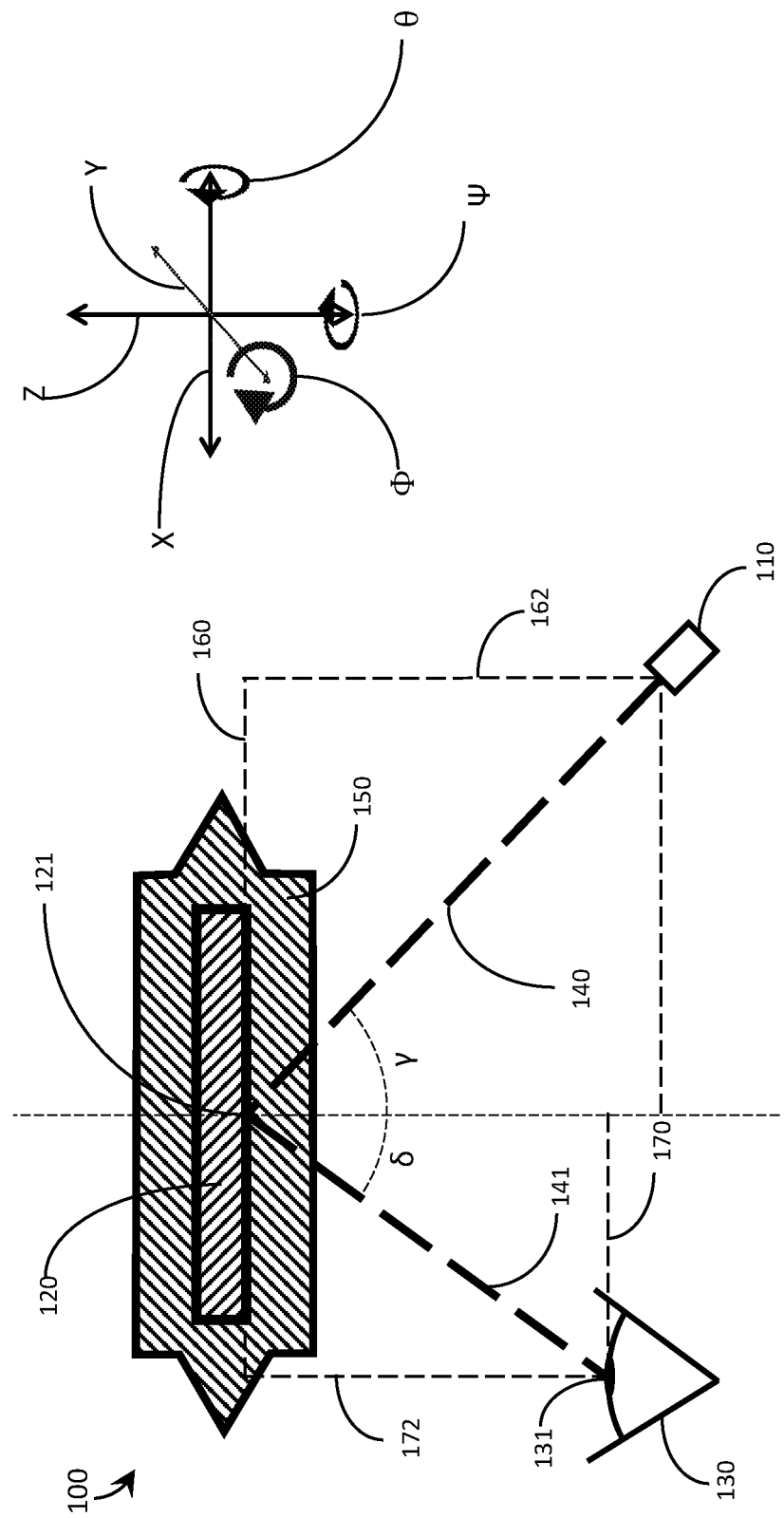
FIG. 1B is a top elevation view of the projector based display positioned relative to the eye in accordance with the present systems, devices, and methods.

FIG. 1B is a top elevation view of the projector based display 100 positioned relative to the eye 130 in accordance with the present systems, devices, and methods. Due to the change in perspective between FIG. 1A and FIG. 1B, DOE 120 and transparent combiner 121 are shown in a cross-sectional view in FIG. 1B. Due to the change in perspective between FIG. 1A and FIG. 1B, projector light 140 impinges on DOE 120 at DOE center 121 at an angle γ and redirected light 141 is generated at an angle δ. FIG. 1B is oriented in the XZ plane, therefore angle γ and angle δ are the angle of projector light 140 and redirected light 141, respectively, in the XZ plane.

Projector 110 is located at a distance 162 in the Z dimension from DOE center 121. The combination of distance 160, 161, and 162, combine to determine the distance between projector 110 and DOE center 121 in three dimensional space; in other words, distance 160, 161, and 162, combine to define the vector distance between projector 110 and DOE center 121.

Pupil 131 is located at a distance 172 in the Z dimension from DOE center 121. The combination of distance 170, 171, and 172, combine to determine the distance between DOE center 121 and pupil 131 in three dimensional space; in other words, distance 170, 171, and 172, combine to define the vector distance between DOE center 121 and pupil 131.

The orientation of DOE 120 relative to projector 110 and/or pupil 131 may also be defined in angular terms, that is the angles θ, φ, and ϕ, which define rotation around the X, Y, and Z, axes, respectively. The angles α and γ depend on the vector distance between projector 110 and DOE center 121. The angles β and γ depend on the vector distance between DOE center 121 and pupil 131. Alignment of DOE 120 with projector 110 is defined as positioning DOE center 121 at a defined vector distance from projector 110. Alignment of DOE 120 with pupil 131 is defined as positioning DOE 120 at a defined vector distance from pupil 131. The greater the precision of the definition of a respective vector distance, the greater the precision of the alignment of the respective elements.

Figure 2:
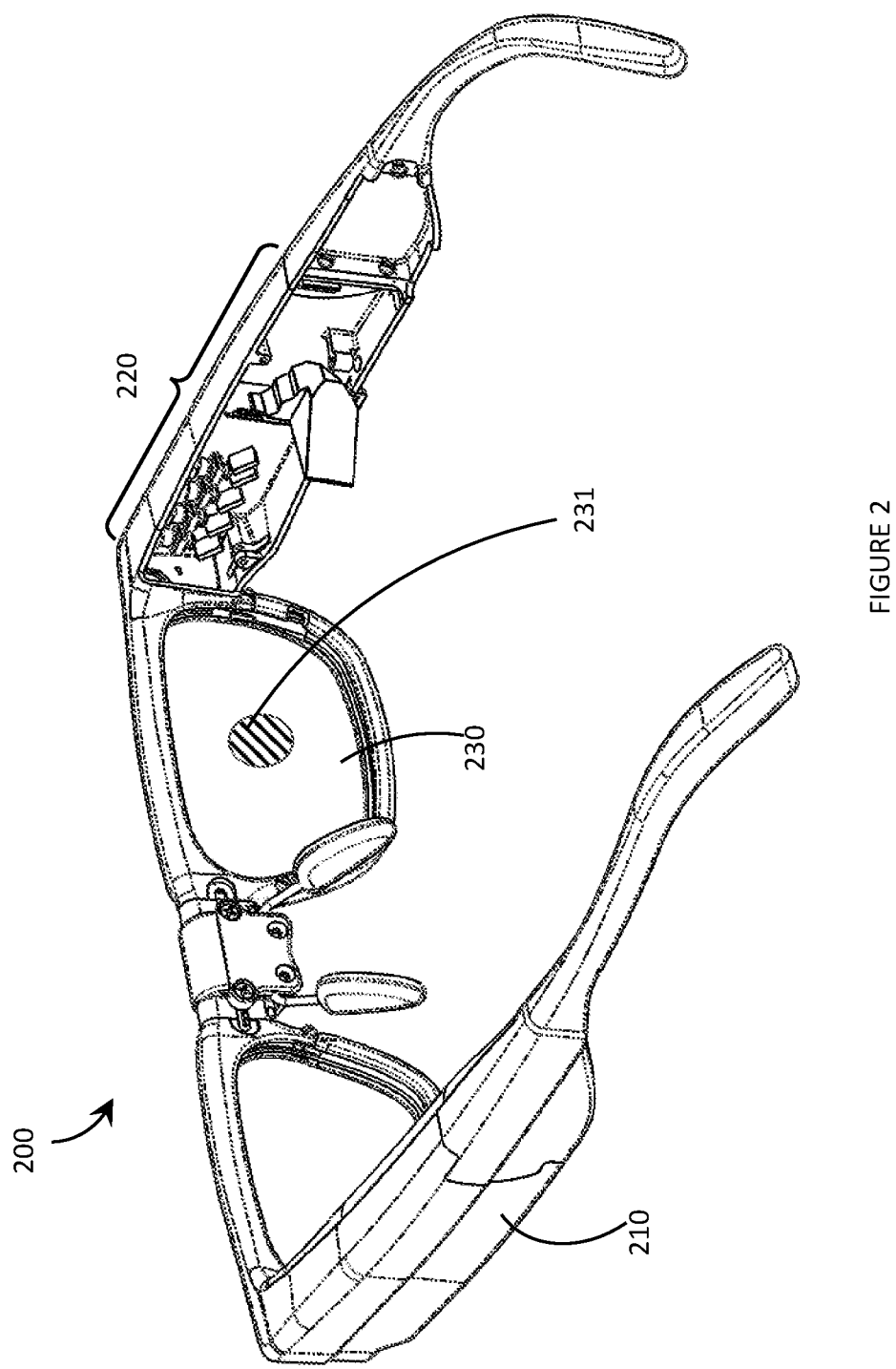
FIG. 2 is a partial-cutaway perspective view of a WHUD that includes a transparent combiner with an embedded diffractive optical element ("DOE") in accordance with the present systems, devices, and methods.

FIG. 2 is a partial-cutaway perspective view of a WHUD 200 that includes a transparent combiner 230 with an embedded diffractive optical element ("DOE") 231 in accordance with the present systems, devices, and methods. Transparent combiner 230 may be substantively similar to transparent combiner 121. DOE 231 may be substantively similar to DOE 120.

WHUD 200 comprises a support structure 210 that is worn on the head of the user and has a general shape and appearance of an eyeglasses (e.g., sunglasses) frame. Support structure 210 carries multiple components, including: a projector 220, and transparent combiner 230. Projector 220 is positioned and oriented to direct light towards the transparent combiner and may include, for example, a microdisplay system, a scanning laser projection system, or another system for generating display images. FIG. 2 provides a partial-cutaway view in which regions of support structure 210 have been removed in order to render visible portions of projector 220 and clarify the location of projector 220 within WHUD 200. Transparent combiner 230 is positioned within a field of view of an eye of the user when the support structure is worn on the head of the user and serves as both a conventional transparent combiner (i.e., prescription or non-prescription depending on the needs of the user) and a transparent combiner.

Figure 3B:
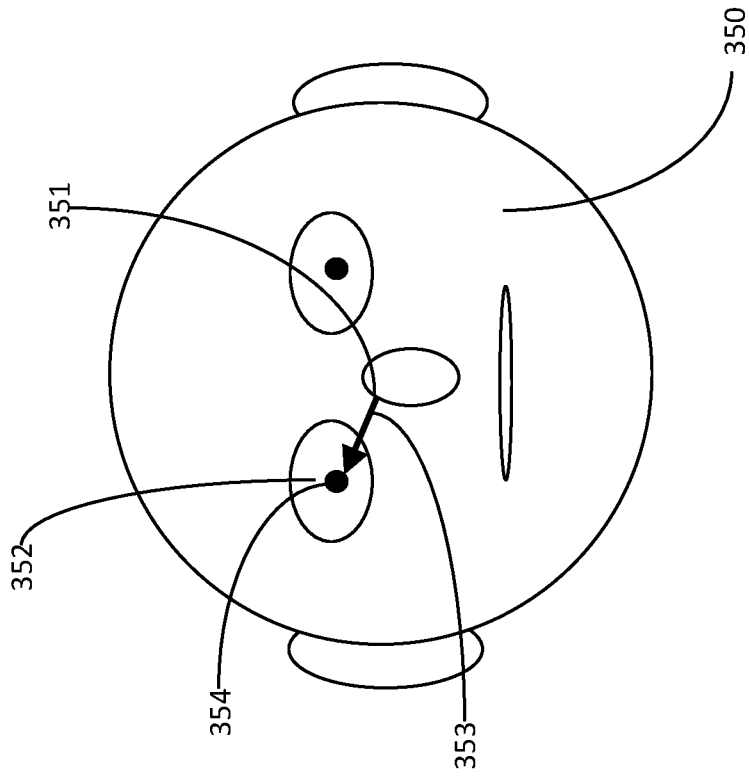
FIG. 3B is a front elevational view of a face of a user.
Figure 3A:
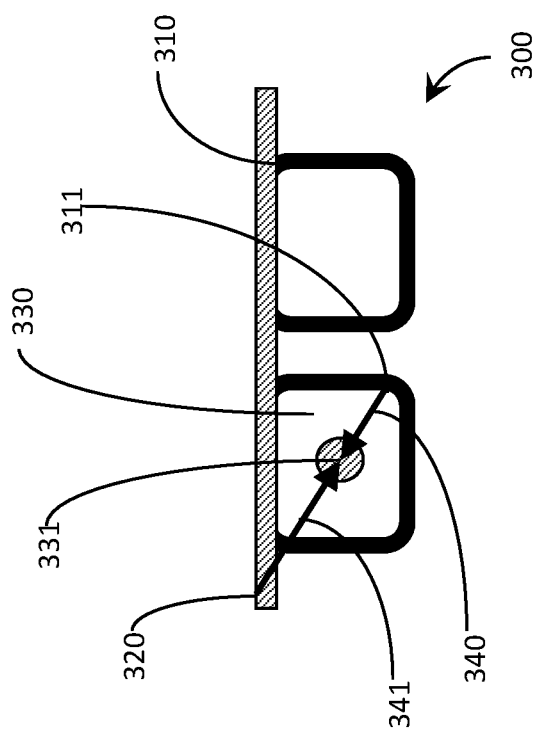
FIG. 3A is a front elevational view of a WHUD that includes a transparent combiner with an embedded diffractive optical element ("DOE") in accordance with the present systems, devices, and methods.

FIG. 3A is a front elevational view of a WHUD 300 that includes a transparent combiner 330 with an embedded diffractive optical element ("DOE") 331 in accordance with the present systems, devices, and methods. Transparent combiner 330 may be substantively similar to transparent combiner 121 and transparent combiner 230. DOE 331 may be substantively similar to DOE 120 and DOE 231.

WHUD 300 comprises a support structure 310 that has a general shape and appearance of an eyeglasses (e.g., sunglasses) frame. Support structure 310 carries multiple components, including: a projector 320, and a transparent combiner 330. Due to the front-elevational view of FIG. 3A, the view of the position of projector 320 is obstructed by support structure 310. The top portion of support structure 210 is cross-hatched to allow for a clear depiction of second vector distance 341 and the obstructed view of projector 320. Projector 320 is positioned and oriented to direct light towards the transparent combiner and may include, for example, a micro-display system, a scanning laser projection system, or another system for generating display images.

Support structure 310 comprises first part of the support structure 311. First vector distance 340 defines the vector distance between first part of the support structure 311 and DOE 331. Second vector distance 341 defines the vector distance between projector 320 and DOE 331.

Transparent combiner 320 comprises a lens. Transparent combiner 320 may comprise one or more coating layers. DOE 331 is embedded within an inner volume of transparent combiner 320; DOE 331 may be positioned within the center of transparent combiner 320, or near to one or more surfaces of transparent combiner 320. DOE 331 may comprise a holographic optical element ("HOE"). WHUD 300 may further comprise a light, where the light guide comprises an incoupler and an outcoupler. DOE 331 may comprise an incoupler for a light guide.

FIG. 3B is a front elevational view of a face of a user 350. Face of a user 350 includes first part 351 of the face of the user 350, eye 352 of the user 350, pupil 354, and third vector distance 353. Third vector distance 353 defines the vector distance between first part 351 of the face of the user 350 and eye 352 of the user 350. Third vector distance 353 comprises the inner pupillary distance ("IPD") of the user. A person of skill in the art will appreciate that the pupil 354 of the eye 352 of the user 350 may move as the user directs there gaze towards different points in the user's field of vision. The position of the eye 352 of the user 350 may therefore be defined as the position of the pupil 354 of the eye 352 of the user 350 when the user directs their gaze at a point corresponding to the center of the FOV of WHUD 300 when WHUD 300 is worn on the face of the user 350.

FIG. 3C is a front elevational view of WHUD 300 as worn on the head of a user 350 in accordance with the present systems, devices, and methods. First part of the support structure 311 is in contact with first part 351 of the face of the user 350 and DOE 331 is aligned with the eye 352 of the user 350. The pupil 354 of the eye 352 of the user 350 is depicted in FIG. 3C as gazing at least approximately directly forward, and that therefore the center of the FOV of WHUD 300 as depicted in FIG. 3C is located at the center of the field of vision of the user 350. A person of skill in the art will appreciate that, in alternative implementations of WHUD 300, the center of the FOV could be located offset from center of the field of vision of user 350. First vector distance 340 therefore is equal to the IPD; in other words first vector distance 340 is equal to third vector distance 353.

FIG. 3D is a top elevational view of WHUD 300 as worn on the head of a user 350 in accordance with the present systems, devices, and methods. Due to the top-elevational view of FIG. 3B, the position of projector 320 is visible, however support structure 310 obstructs the view of transparent combiner 330, DOE 331, and first part of the support structure 311. The orientation of first vector distance 340 and second vector distance 341 are shown to clarify the three-dimensional nature of said vector distances.

Figure 4:
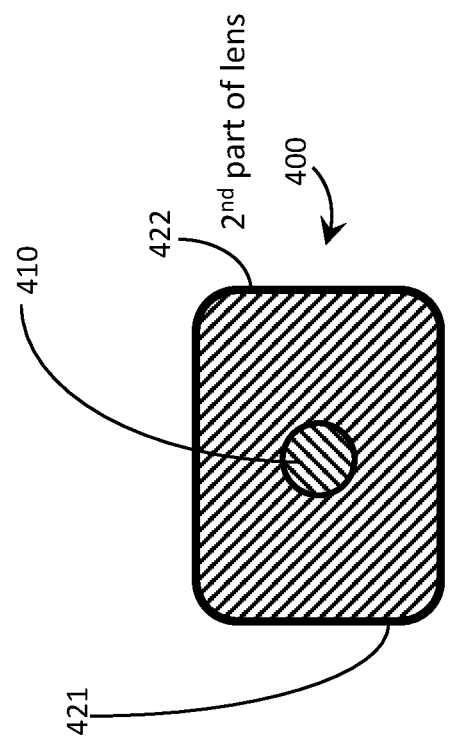
FIG. 4 is a cross-sectional view of lens in accordance with the present systems, devices, and methods.

FIG. 4 is a cross-sectional view of lens 400 in accordance with the present systems, devices, and methods. Lens 400 comprises DOE 410, first part of the lens 421, and second part of the lens 422. Lens 400 may be substantively similar to transparent combiner 121, transparent combiner 230, and transparent combiner 330. DOE 410 is, for example, embedded within an inner volume of lens 400.

Figure 5:
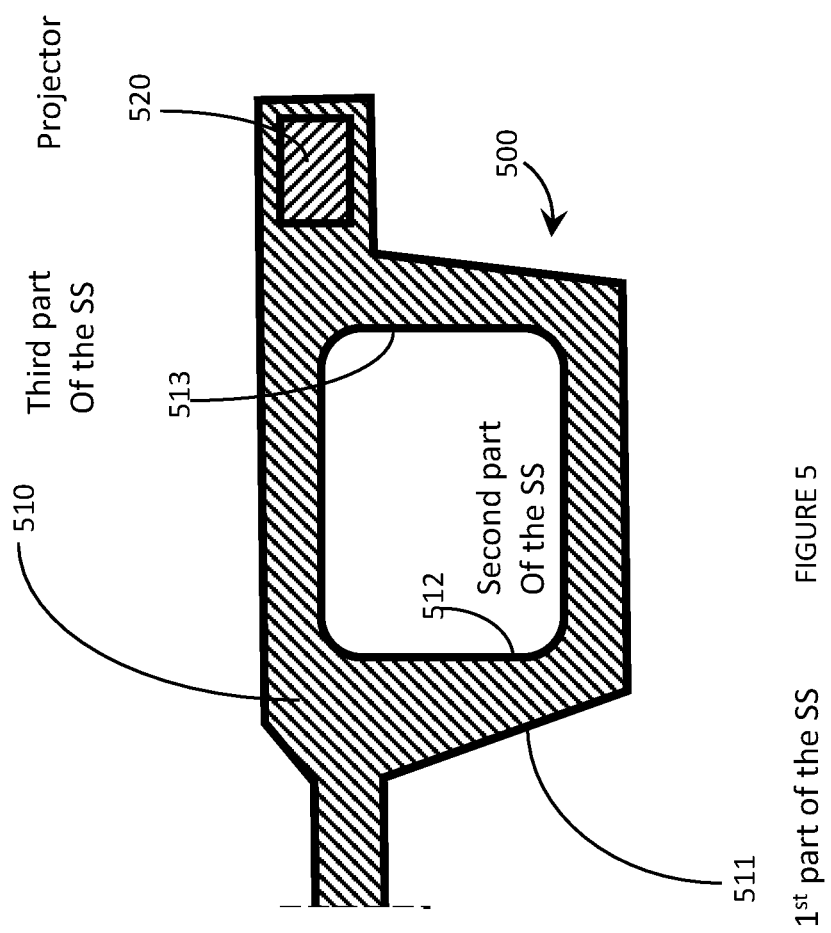
FIG. 5 is a cross-sectional view of support structure in accordance with the present systems, devices, and methods.

FIG. 5 is a cross-sectional view of support structure 500 in accordance with the present systems, devices, and methods. Support structure 500 may be substantively similar to support structure 210 and support structure 310. Support structure 500 comprises first part of the support structure 511. First part of the support structure 511 may be substantively similar to first part of the support structure 311. Support structure 5100 comprises second part of the support structure 512, third part of the support structure 313, and projector mount 520. A projector (not illustrated in FIG. 5) may be physically coupled to projector mount 520.

Lens 400 may be physically coupled to support structure 510. Physically coupling lens 400 to support structure 510 may include physically coupling first part of the lens 421 to second part of the support structure 512. Physically coupling lens 400 to support structure 510 may include physically coupling second part of the lens 422 to third part of the support structure 513.

When lens 400 is physically coupled to support structure 500, the position of DOE 410 relative to projector mount 520 may be controlled by controlling the position of DOE 410 relative to second part of the lens 422. In other words, DOE 410 may be aligned with projector mount 520 (and therefore any projector physically coupled to projector mount 520) by aligning DOE 410 with second part of the lens 422.

When lens 400 is physically coupled to support structure 500, the position of DOE 410 relative to first part of the support structure 511 may be controlled by controlling the position of DOE 410 relative to first part of the lens 421. In other words, DOE 410 may be aligned with first part of the support structure 511 (and therefore any part of the face of the user in contact with first part of the support structure 511 when support structure 511 is worn on a head of a user, and by extension the pupil of the eye of the user via the IPD) by aligning DOE 410 with first part of the lens 421.

Figure 6:
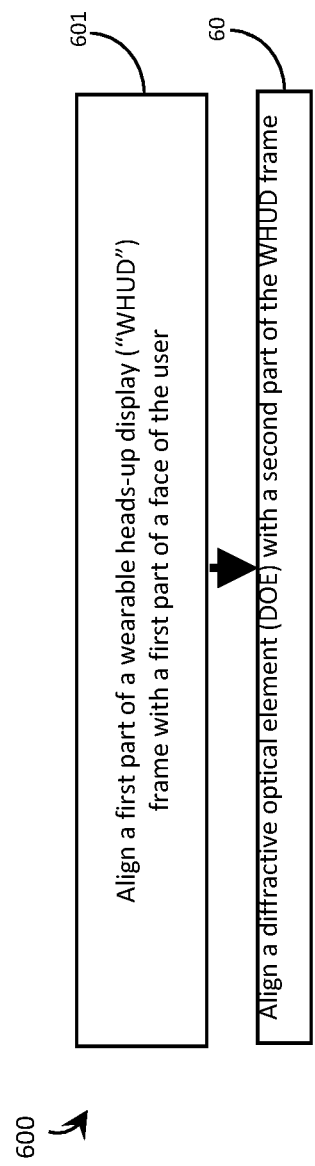
FIG. 6 is a flow-diagram showing a method to align a DOE within a wearable heads-up display (WHUD) with an eye of a user when the WHUD is worn on a head of a user in accordance with the present systems, devices, and methods.

FIG. 6 is a flow-diagram showing a method 600 to align a diffractive optical element("DOE") within a wearable heads-up display (WHUD) with an eye of a user when the WHUD is worn on a head of a user in accordance with the present systems, devices, and methods. Method 600 includes two acts 601, and 602, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 600, analogous structures from FIG. 1, FIG. 2, FIG. 3, FIG. 4, FIG. 5, FIG. 7, and FIG. 8, are called out in parentheses throughout the description of act 601.

At 601, a first part of a WHUD frame (311, 511) is aligned with a first part of a face of the user (351). Aligning the first part of the WHUD frame (311, 511) with a first part of the face of the user (351) ensures that there is a fixed orientation and position of each part of the WHUD frame relative to the entire face of the user. In other words, alignment with a part of the WHUD frame also means alignment with a part of the face of the user.

At 602, a diffractive optical element ("DOE") (120, 231, 331, 410) is aligned with a second part of the WHUD frame (513). A person of skill in the art will appreciate that method 600 may be applied to alignment of a broad range of DOEs (120, 231, 331, 410) in a WHUD, and including holograms within a WHUD.

A DOE is aligned with an eye (130) of a user (352) when the pupil (352) of the user is within the eyebox of the WHUD for at least a portion of the FOV of the display. In other words, a DOE is aligned with the eye of the user when the user is able to see the display across at least a portion of the range of motion of the pupil of the eye of the user. A person of skill in the art will appreciate that a user may change the position of their pupil by directing their gaze in different directions, and that a DOE may be aligned with an eye (130) of a user (352) even though the user may be able to direct their gaze outside the eyebox of the display. A WHUD with a very large FOV may cover the entire range of motion of the pupil of the eye of the user.

Method 600 may further comprise determining an inner pupillary distance ("IPD") (353), the IPD (353) being a vector distance between the eye (130) of the user (352) and the first part of the face of the user (353). The IPD (353) of the user may be determined by measuring the face of the user (350). Determining the IPD of the user allows for alignment of the DOE with the eye (130) of the user (352) when the WHUD is produced, rather than requiring an additional custom-fitting step after manufacture of the WHUD. Method 600 may further comprise determining an outer pupillary distance (OPD) (341), the OPD (341) being a vector distance between a projector (110, 220, 320) and the eye (130) of the user (350). The OPD (341) of the user may be determined by measuring the face of the user (350). Determining the OPD of the user allows a free-space display geometry to be employed in the WHUD while preventing display light from being obstructed by the face of the user (350). WHUD frames (210, 310, 510) may be made in different sizes to fit the faces of different users. Typically, the size of the WHUD frame (210, 310, 510) will vary by varying a width of the frames (a one-dimensional variation). The effect of changing the width of the WHUD frame (210, 310, 510) may cause the position of the DOE relative to the position of the second part of the WHUD frame (513) to vary in three dimensions, therefore while WHUD frames (210, 310, 510) may vary in a one-dimensional quantity, their IPD and OPD values may vary in three-dimensional positions, therefore IPDs and OPDs are most accurately expressed as vector distances.

Aligning a first part of a WHUD frame (311, 511) with a first part (351) of a face of the user (350) and aligning the DOE (120, 231, 331, 410) with a second part of the WHUD frame (513) causes the distance between the DOE (120, 231, 331, 410) and the first part of the WHUD frame (311, 511) to be equal to the IPD (340, 353).

Aligning the DOE (120, 231, 331, 410) with the second part of the WHUD frame (513) may include aligning the DOE (120, 231, 331, 410) with the projector (110, 220, 320, 520), wherein the projector (110, 220, 320, 520) is physically coupled to the WHUD frame (210, 310, 510), and wherein aligning the DOE (120, 231, 331, 410) with the projector (110, 220, 320, 520) causes the distance between the DOE (120, 231, 331, 410) and the projector (110, 220, 320, 520) to be equal to the OPD (341).

Method 600 may further comprise: providing a WHUD frame (210, 310, 510) selected from a group of WHUD frames, wherein each WHUD frame (210, 310) has a respective IPD, the IPDs of at least some of the WHUD frames (210, 310) different from the IPDs of other WHUD frames (210, 310, 510), and wherein aligning a first part of a WHUD frame (311, 511) with a first part (351) of a face of a user (350) includes aligning a first part of the provided WHUD frame (311, 511) with the first part (351) of the face of the user (350).

Selecting the WHUD frame from a group of WHUD frames with differing IPDs increases the speed at which the WHUD may be manufactured, as selecting a WHUD frame from a previously-manufactured group of WHUD frames is faster than manufacturing the WHUD frame after the IPD has been determined. A WHUD frame (210, 310, 510) may have an IPD (340, 353) by having a vector distance between the first part of the WHUD frame (311, 511) and the DOE (120, 231, 331, 410) equal to the IPD (353) of the user when the WHUD is worn on the head of the user (350).

Each WHUD frame (210, 310, 510) in the group of WHUD frames may have the same OPD (341) as each other WHUD frame (210, 310, 510) in the group of WHUD frames, and wherein aligning the DOE (120, 231, 331, 410) with the second part of the WHUD frame (513) may include aligning the DOE (120, 231, 331, 410) with the second part of the provided WHUD frame (513). Maintaining the same OPD across a group of WHUD frames is advantageous as it allows the same projector geometry to be used for all WHUD frames in the group of WHUD frames, instead of requiring a unique projector for each WHUD frame in the group of WHUD frames.

The group of WHUD frames may comprise at least two sub-groups. Each WHUD frame (210, 310, 510) in each sub-group may have the same OPD (341) as each other WHUD frame (210, 310, 510) in the same sub-group. The OPD (341) of the WHUD frames in each sub-group may be different from the OPD (341) of the WHUD frames in each other sub-group. A WHUD frame (210, 310, 510) may have an OPD (341) by having a vector distance between the DOE (120, 231, 331, 410) and the second part of the WHUD frame (513) equal to the OPD (341) of the user when the WHUD is worn on the head of the user (350).

Providing a WHUD frame (210, 310, 510) selected from a group of WHUD frames may include providing a WHUD frame (210, 310, 510) selected from one of the at least two sub-groups. Aligning the DOE (120, 231, 331, 410) with the second part of the WHUD frame (513) may include aligning the DOE (120, 231, 331, 410) with the second part of the provided WHUD frame (513). Choosing a WHUD frame from a sub-group of WHUD frames with different OPDs may be advantageous as, while this requires additional projector geometries, different OPDs may allow for different locations of the projector relative to the face of the user; this may prevent projector light from being obstructed by the face of the user.

Figure 8:
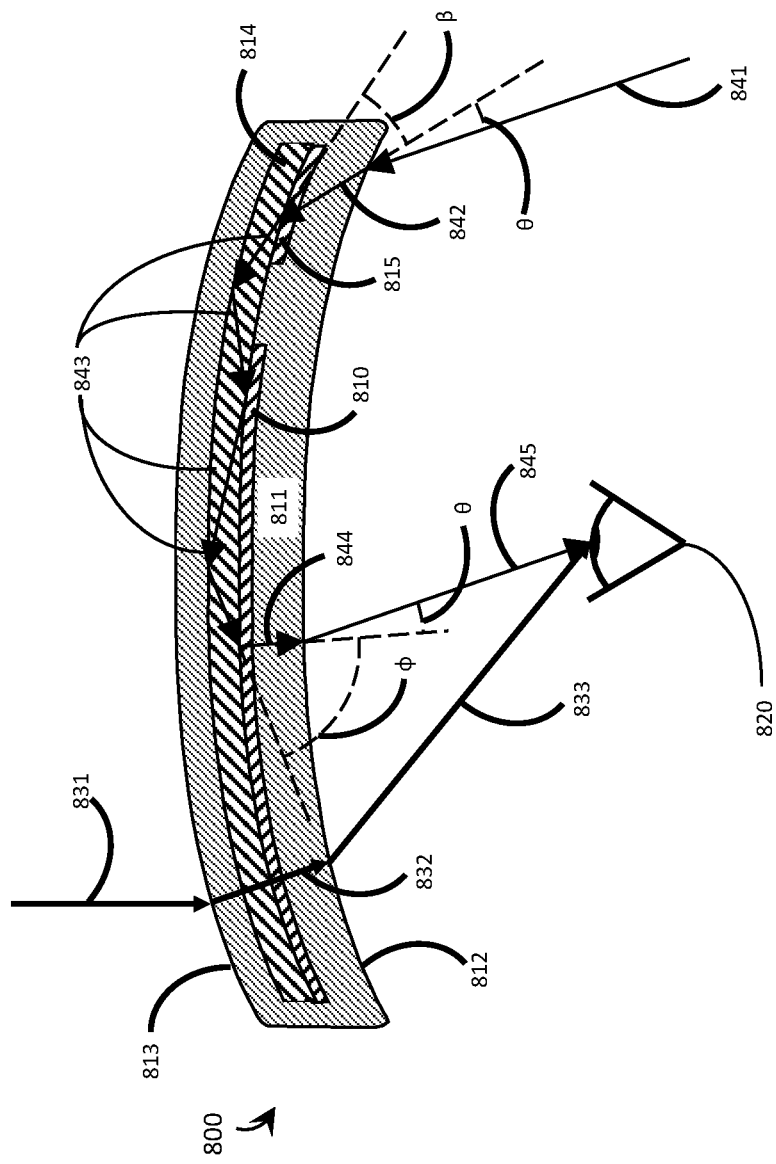
FIG. 8 is a cross-sectional view of an exemplary lens assembly suitable for use in a WHUD in accordance with the present systems, devices, and methods.

FIG. 8 is a cross-sectional view of an exemplary lens assembly 800 suitable for use in a WHUD in accordance with the present systems, devices, and methods. lens assembly 800 comprises DOE 810, curved lens 811, light guide 814, and additional DOE 815. Lens assembly 800 may comprise at least one additional DOE substantively similar to DOE 810. Lens assembly 800 may be substantively similar to transparent combiner 150, transparent combiner 230, transparent combiner 330, and lens 400. DOE 810 is embedded within an internal volume of lens 811. Additional DOE 815 is embedded within an internal volume of lens 811. Curved lens 811 comprises eye-side surface 812 and world-side surface 813, wherein world-side surface 813 is opposite eye-side surface 812 across a thickness of curved lens 811 to delineate an internal volume of curved lens 811. Eye-side surface 812 has a first curvature. World-side surface 813 has a second curvature.

The center or axis of curvature, as appropriate, of eye-side surface 812 may be located at a distance of between 1 and 10 centimeters, between 10 and 50 cm, or between 50 and 1000 cm from eye-side surface 812. The center or axis of curvature, as appropriate, of world-side surface 813 may be located at a distance of between 1 and 10 centimeters, between 10 and 50 cm, or between 50 and 1000 cm from world-side surface 813. DOE 810 applies a first optical power $\phi$ to a redirected light. Eye-side surface 812 has a first curvature to apply a second optical power $\theta$ to the redirected light. The first optical power $\phi$ is equal in magnitude and opposite in sign to the second optical power $\theta$. In other words, first optical power $\phi$ compensates for the first curvature of eye-side surface 812.

DOE 810 may comprise a holographic outcoupler. DOE 815 may comprise a holographic incoupler. Light guide 814 is embedded within an internal volume of curved lens 811. Light guide 814 is optically coupled to DOE 810 and DOE 815 to route light from DOE 815 through light guide 814 to DOE 810. DOE 810 may apply at least one additional holographic optical power to light. DOE 815 applies a third optical power $\beta$ to the light. DOE 815 may apply at least one additional holographic optical power to light. Eye-side surface 812 has a first curvature to apply a second optical power $\theta$ to the light.

DOE 810 may be played back by illuminating lens assembly 800 with incident light 841. Upon reaching eye-side surface 812, the second optical power $\theta$ is applied to incident light 841; the resulting change in angle and/or convergence and/or divergence converts incident light 841 into incident light 842. At least a portion of incident light 842 is then redirected by DOE 815 to enter light guide 1114 and form guided light 843. DOE 815 applies a third optical power $\beta$ to guided light 843. Light guide 814 guides guided light 843 to DOE 810. At least a portion of guided light 843 is then redirected by DOE 810 to form redirected light 844.

Upon reaching eye-side surface 812, the second optical power $\theta$ is applied to redirected light 844; the resulting change in angle and/or convergence and/or divergence converts redirected light 844 into redirected light 845. Redirected light 845 then reaches eye of the user 820.

Environmental light 831 originates in the environment on the world-side of lens assembly 800. Upon reaching world-side surface 813, a fourth optical power may be applied to environmental light 831, converting environmental light 831 to environmental light 832. Upon reaching eye-side surface 812, the second optical power $\theta$ may be applied to environmental light 832, converting environmental light 832 to environmental light 833. Environmental light 833 has an angle that causes environmental light 833 to reach eye of the user 820. The second optical power $\theta$ applied to environmental light 831 may have a magnitude of zero, and the fourth optical power applied to environmental light 1031 may have a magnitude of zero.

Throughout this specification and the appended claims, the term "environmental light" refers to light that originates from light sources in the ambient environment of a WHUD, as opposed to light that originates from a projector. Environmental light may be incoherent and/or polychromatic. Non-exclusive sources of environmental light include direct sunlight, indirect sunlight, and overhead artificial lights. Typically, the portion of environmental light that may be redirected by a DOE is negligible compared to the portion of environmental light that cannot be redirected by the DOE, therefore environmental light typically passes through a DOE without any interaction with said DOE.

Returning to FIG. 6, the WHUD may comprise an eyeglass lens (230, 330, 400, 800) and a projector (110, 220, 320). The DOE (120, 231, 331, 410) may be embedded within an internal volume of the eyeglass lens (230, 330, 400, 800). The use of eyeglass lenses in WHUDs is advantageous as eyeglass lenses have increased aesthetic appeal. Aligning a DOE (120, 231, 331, 410) with an eye (130) of the user (352) may include compensating for the deviation in the optical path between the eye (130) of the user (352) and the DOE (130, 231, 331, 410) due to the curvature of the eyeglass lens (230, 330, 400, 800). Aligning the DOE (120, 231, 331, 410) with a second part of the WHUD frame (513) may include compensating for the deviation in the optical path between the projector (110, 220, 320) and the DOE (120, 231, 331, 410) due to a curvature of the eyeglass lens (230, 330, 400, 800). Diffraction of light may occur when light enters or exits the transparent combiner; this may be particularly problematic with transparent combiners comprising an eyeglass lens due to the curvature of eyeglass lenses. Compensating for the deviation in optical path due to the curvature of the eyeglass lens is advantageous as this allows alignment of the DOE (120, 231, 331, 410) with the eye of the user (350) along the entire optical path of light as light travels from the projector into the eye of the user.

Aligning the DOE (120, 231, 331, 410) with a second part of the WHUD frame (513) may include edging a lens blank (700) to form an eyeglass lens (230, 330, 400, 800), wherein the lens blank (700) comprises the DOE (120, 231, 331, 410), and the eyeglass lens (230, 330, 400, 800) comprises the DOE (120, 231, 331, 410), a first lens edge (421), and a second lens edge (422). Aligning the DOE (120, 231, 331, 410) with a second part of the WHUD frame (513) may include physically coupling the first lens edge (421) to a third part of the WHUD frame (512) and physically coupling the second lens edge (422) to a fourth part of the WHUD frame (513). Edging a lens blank (700) includes shaping the edges of the lens blank (700) to produce a lens (230, 330, 400, 800) with a shape that fits inside an eyeglass lens frame (210, 310, 510) and the lens (230, 330, 400, 800) may be physically coupled to the eyeglass lens frame (210, 310, 510). Edging the lens blank (700) includes removing material from the lens blank (700). Edging the lens (230, 330, 400, 800) may shaping the edges of the lens (230, 330, 400, 800) to form a flange, wherein the eyeglass lens frame (210, 310, 510) includes a groove, and physically coupling the eyeglass lens (230, 330, 400, 800) to the eyeglass lens frame (210, 310, 510) includes fitting the flange into the groove.

Edging the lens blank (700) typically includes blocking the lens blank (700). Blocking the lens blank (700) includes physically coupling a blocking body to the surface of a lens blank (700) with a blocking adhesive; the lens blank (700) is then physically coupled to the edging machine via the blocking body. Typical blocking adhesives include UV-curable adhesives and metal alloys with a melting point in the range of 117° F. to 158° F. Blocking adhesives typically have low bonding strength to ensure that the blocking adhesive does not damage the finished surface of the lens (230, 330, 400, 800) when the blocking adhesive is removed.

The edging of the lens blank (700) to precisely align the DOE (120, 231, 331, 410) with the projector (110, 220, 320) and with the eye of the user (120, 352) may be achieved through the use of fiducial marks. A fiducial is an identifiable mark on or in the lens blank (700) for which the location, relative to the DOE (120, 231, 331, 410), is known with high precision.

Edging a lens blank (700) to form an eyeglass lens (230, 330, 400, 800) may include applying at least one temporary fiducial mark (720) to the lens blank (700). A temporary fiducial mark (720) is a fiducial mark located in a part of the lens blank (700) which is removed during edging and is therefore not present in the finished lens (230, 330, 400, 800). Temporary fiducial mark (720), which are not present in the finished lens (230, 330, 400, 800), are preferred for aesthetic reasons, as permanent fiducials may be visible in the finished WHUD and may be aesthetically unpleasant. Temporary fiducial marks (720) are applied during lens blank (700) manufacturing, typically using the edge of the pre-form as a reference point. Application methods include printing a mark on the DOE (120, 231, 331, 410) with a printer (ink jet printer, laser printer, etc.), laser etching the DOE (120, 231, 331, 410), and laser etching the lens blank (700). The typical processes for fiducial application are sufficiently precise for the purposes of locating the optical center of a lens (230, 330, 400, 800), but insufficiently precise to locate the center of the DOE (120, 231, 331, 410) for precise alignment of the DOE (120, 231, 331, 410).

To achieve the precision employed for DOE (120, 231, 331, 410) alignment, the fiducials may be applied using a typical and imprecise application method, followed by a high-precision measurement of the location of the DOE (120, 231, 331, 410) relative to the fiducials. DOE center (711) measurement may be performed by playing back the DOE (120, 231, 331, 410) with laser light, using the position and angle of the playback light to find the precise center of the DOE (120, 231, 331, 410). The position of the fiducials relative to the DOE center (711) may be measured from the DOE center (711) and compared to the nominal fiducial position; a fiducial offset for each fiducial may then be calculated and recorded. Once each fiducial offset is known, the fiducials may thereafter be used for high-precision location of the DOE (120, 231, 331, 410), since the fiducial offsets (unique to each fiducial) provide a correction factor to the initially imprecise fiducial placement.

Precise fiducials (with offsets) may be used for lateral (linear movement in the X, Y, and/or Z dimensions) and angular (rotational alignment around the X, Y, and/or Z dimensions) alignment. As an alternative, a relatively high-powered laser may be used to write fiducials into the pre-form after finding the DOE center (711); these laser cut fiducials will be temporary so long as they are located outside the area that will form the lens (230, 330, 400, 800) after edging the pre-form (may need multiple potential fiducial locations, and/or use fiducial offsets, to ensure this).

As an alternative, the placement of the blocking body may be measured with high precision to determine a blocking offset (where a blocking offset is similar in some ways to a fiducial offset), with the precise position of the blocking body then serving as a precise fiducial; since the blocking body is removed after edging this would also constitute a temporary fiducial mark (720). Edging a lens blank (700) to form an eyeglass lens (230, 330, 400, 800) may include blocking the lens blank (700), and determining a blocking offset.

Figure 7:
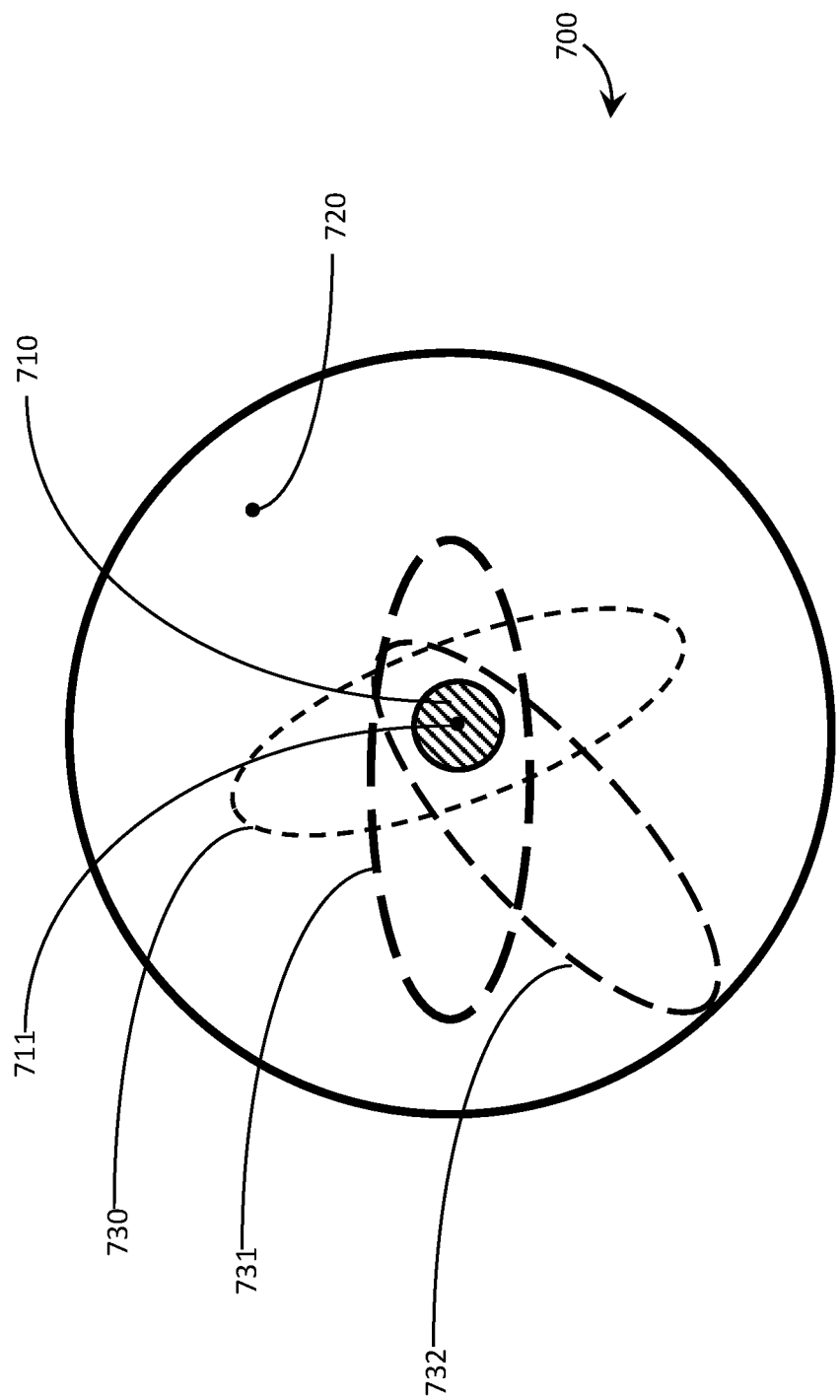
FIG. 7 depicts a front elevational view of lens blank in accordance with the present systems, devices, and methods.

FIG. 7 depicts a front elevational view of lens blank 700 in accordance with the present systems, devices, and methods. Lens blank 700 comprises DOE 710 and temporary fiducial 720. DOE 710 comprises DOE center 711. When temporary fiducial 720 is applied to lens blank 700, the position of temporary fiducial 720 is a nominal position; in other words, temporary fiducial 720 is intended to be located at a defined position relative to DOE center 711, however known imprecision in the placement of temporary fiducial 711 causes the positioning of temporary fiducial to exist in name only. The actual position of temporary fiducial 720 relative to DOE center 710 may not be equal to the nominal position of temporary fiducial 720 relative to DOE center 710 due to the imprecise placement of temporary fiducial 720, The precise location of DOE 710 may be determined by illuminating DOE 710 with light and measuring the angle and location of light diffracted by DOE 710. Once the precise position of DOE 710 (and DOE center 711) are known, the position of temporary fiducial 720 may then be measured with high precision relative to DOE center 710. Any difference between the nominal position of temporary fiducial 720 relative to DOE center 710 and the actual position of temporary fiducial 720 relative to DOE center 710 may then be calculated as a fiducial offset. The fiducial offset may be applied to the nominal position of temporary fiducial 720 to determine the precise location of temporary fiducial 720.

Lens blank 700 may be edged to form lenses of varying shape, size, and with a varying position and orientation of DOE 710. Shown in FIG. 7 are first edging pattern 730, second edging pattern 731, and third edging pattern 732, referred to as a group by the term "edging patterns". Each of the edging patterns possesses a unique position and orientation of DOE 710, wherein the material within each edging pattern remains after edging. A person of skill in the art will appreciate that there are many more potential lens shapes and/or DOE positions that may be produced from lens blank 700, so long as the edging of lens blank 700 includes the removal of temporary fiducial 720 (in other words, the material of lens blank 700 that remains after edging excludes temporary fiducial 720).

Returning to FIG. 6, applying at least one temporary fiducial mark (720) to the lens blank (700) may include laser-etching the lens blank (700). Applying at least on temporary fiducial mark (720) to the lens blank (700) may include printing at least one fiducial mark onto the lens blank (700). Method 600 may further comprise determining at least one fiducial offset for the at least one fiducial mark. Determining at least one fiducial offset may include measuring a playback of the DOE (120, 231, 331, 410). DOE (120, 231, 331, 410) playback is the process by which the DOE (120, 231, 331, 410) redirects light, and measuring DOE (120, 231, 331, 410) playback may include measuring the angle, position, wavelength, and/or intensity of the light redirected by the DOE (120, 231, 331, 410).

Determining at least one fiducial offset may include determining at least one fiducial offset selected from a group consisting of: a lateral offset in a first dimension, a lateral offset in a second dimension perpendicular to the first dimension, a lateral offset in a third dimension perpendicular to the first dimension and perpendicular to the second dimension, an angular offset around a first axis wherein the first axis is aligned along the first dimension, an angular offset around a second axis wherein the second axis is aligned along the second dimension perpendicular to the first dimension, and an angular offset around a third axis wherein the third axis is aligned along the third dimension perpendicular to the first dimension and perpendicular to the second dimension.

Edging a lens blank (700) to form an eyeglass lens (230, 330, 400, 800) may include edging the lens blank (700) to form a prescription lens (230, 330, 400, 800). Prescription lenses are advantageous as they allow the WHUD to serve as both a display and as a vision correction device. Edging the lens blank (700) to form a prescription lens may include edging the lens blank (700) to align an optical center of the prescription lens with the second part of the WHUD frame (513). Aligning the optical center of the prescription lens with the second part of the WHUD frame (513) aligns the optical center of the prescription lens with the eye (130) of the user (352).

Prescription eyeglass lenses possess an optical center that, when positioned in front of the eye (130) of the user 352), provides the user with optimal vision correction. In other words, positioning the optical center in front of the eye (130) of the user 352) is advantageous as it improves the ability of the user to clearly view their environment. A person of skill in the art of optics will appreciate that aligning the DOE (120, 231, 331, 410) with the eye (130) of the user (352) and aligning the optical center of the prescription lens with the eye (130) of the user (352) will not necessarily cause the optical center of the prescription to overlap with the DOE (120, 231, 331, 410). The optical center of the prescription is typically positioned in the line of sight of the eye (130) of the user (352) to avoid creating any un-prescribed prism optical power. DOEs (120, 231, 331, 410) may redirect and/or diffract light into the eye (130) of the user (352) at a variety of angles, therefore the DOE (120, 231, 331, 410) may be ideally aligned with the eye (130) of the user (352) by placing the DOE (120, 231, 331, 410) at a position that does not overlap with the optical center of the prescription.

Edging the lens blank (700) to align an optical center of the prescription lens with the second part of the WHUD frame (513) may include adding a planar optical power to the optical power of the prescription lens. Adding a planar optical power to the optical power of the prescription allows greater variation in the positioning of the DOE (120, 231, 331, 410) without creating un-prescribed prism optical power.

Edging the lens blank (700) to align an optical center of the prescription lens with the second part of the WHUD frame (513) may include aligning the prescription lens in the Z direction. The DOE (120, 231, 331, 410) may require alignment in the Z direction to align the DOE (120, 231, 331, 410) with the eye (130) of the user (352), including alignment of the DOE (120, 231, 331, 410) in a prescription lens. Typical WHUDs comprise two lenses, one for each eye. One lens (230, 330, 400, 800) may be the transparent combiner of the WHUD, while the second lens performs no display-related function, but is included for aesthetic and/or prescription purposes. If the second lens comprises a prescription lens and alignment of the DOE (120, 231, 331, 410) with the second part of the WHUD frame (513) requires alignment in the Z direction, this alignment may include lateral displacement of the transparent combiner in the Z direction. An equal lateral displacement in the Z direction may be applied to the second lens to ensure that both lenses remain within prescription tolerances.

A person of skill in the art will appreciate that the various embodiments for aligning a lens in a laser projector described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional Patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Publication No. US Patent Application Publication No. US 2016-0238845 A1, US Patent Application Publication No. 2017-0068095, U.S. Provisional Patent Application Ser. No. 62/534,099, U.S. Provisional Patent Application Ser. No. 62/565,677, U.S. Provisional Patent Application Ser. No. 62/525,601, U.S. Provisional Patent Application Ser. No. 62/557,551, U.S. Provisional Patent Application Ser. No. 62/557,554, U.S. Provisional Patent Application Ser. No. 62/573,978, U.S. Provisional Patent Application Ser. No. 62/680,449, U.S. Provisional Patent Application Ser. No. 62/702,657, U.S. Non-Provisional patent application Ser. No. 16/057,432, U.S. Provisional Patent Application Ser. No. 62/734,798, and U.S. Provisional Patent Application Ser. No. 62/755,206.

are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display ("WHUD") comprising:
a support structure;
a projector carried by the support structure; and
a transparent combiner positioned and oriented with respect to the support structure to appear in a field of view of an eye of a user when the support structure is worn on a head of the user, the transparent combiner comprising:
a lens carried by the support structure; and
a diffractive optical element ("DOE") positioned within the lens to align the DOE with the eye of the user when the support structure is worn on the head of the user, wherein a distance between a first part of the support structure and the DOE is approximately equal to a measurement of an inner pupillary distance ("IPD") that is a vector distance between a pupil of the eye of the user and a first specified part of a face of the user, the first part of the support structure being configured to contact the first specified part of the face of the user.

2. The WHUD of claim 1 wherein:
the support structure has a second part that is different from the first part of the support structure;
the lens has a first part that is coupled to the second part of the support structure; and
a sum of a vector distance from the first part of the support structure to the second part of the support structure, and a vector distance from the first part of the lens to the DOE, is equal to the IPD.

3. The WHUD of claim 2 wherein:
a vector distance between the projector and the DOE characterizes an outer pupillary distance ("OPD");
the support structure has a third part;

the lens has a second part, the second part of the lens physically coupled to the third part of the support structure; and a sum of a vector distance from the DOE to the second part of the lens, and a vector distance from the third part of the support structure to the projector, is equal to the IPD.

4. A method to align a diffractive optical element ("DOE") within a wearable heads-up display (WHUD) with an eye of a user when the WHUD is worn on a head of a user, the method comprising:

aligning a first part of the WHUD frame with a first part of a face of the user;

aligning the DOE with a second part of the WHUD frame; and determining an outer pupillary distance (OPD), the OPD being a vector distance between a projector and the eye of the user, wherein aligning the DOE with the second part of the WHUD frame includes aligning the DOE with the projector, wherein the projector is physically coupled to the WHUD frame, and wherein aligning the DOE with the projector causes a distance between the DOE and the projector to be equal to the OPD.

5. The method of claim 4, further comprising:

determining an inner pupillary distance (IPD), the IPD being a vector distance between the eye of the user and the first part of the face of the user, wherein aligning a first part of a WHUD frame with a first part of a face of the user and aligning the DOE with a second part of the WHUD frame cause a distance between the DOE and the first part of the WHUD frame to be equal to the IPD.

6. The method of claim 5, further comprising: providing a WHUD frame selected from a group of WHUD frames, wherein each WHUD frame has a different IPD than each other WHUD frame, and wherein aligning a first part of a WHUD frame with a first part of a face of a user includes aligning a first part of the provided WHUD frame with the first part of the face of the user.

7. The method of claim 6 wherein each WHUD frame in the group of WHUD frames has a same OPD as each other WHUD frame in the group of WHUD frames, and wherein aligning the DOE with the second part of the WHUD frame includes aligning the DOE with the second part of the provided WHUD frame.

8. The method of claim 6 wherein:

the group of WHUD frames comprises at least two sub-groups;

each WHUD frame in each sub-group has a same OPD as each other WHUD frame in the same sub-group;

the OPD of the WHUD frames in each sub-group is different from the OPD of the WHUD frames in each other sub-group;

providing a WHUD frame selected from a group of WHUD frames includes providing a WHUD frame selected from one of the at least two sub-groups; and aligning the DOE with the second part of the WHUD frame includes aligning the DOE with the second part of the provided WHUD frame.

9. The method of claim 4 wherein the WHUD comprises an eyeglass lens and a projector, the DOE is embedded within an internal volume of the eyeglass lens, and wherein aligning a DOE with a second part of the WHUD frame includes compensating for a deviation in the optical path between the eye of the user and the DOE due to the curvature of the eyeglass lens.

10. The method of claim 9 wherein aligning the DOE with a second part of the WHUD frame includes compensating for a deviation in the optical path between the projector and the DOE due to a curvature of the eyeglass lens.

11. The method of claim 9 wherein aligning the DOE with a second part of the WHUD frame includes:

edging a lens blank to form the eyeglass lens, wherein the lens blank comprises the DOE, and the eyeglass lens comprises the DOE, a first lens edge, and a second lens edge;

physically coupling the first lens edge to a third part of the WHUD frame; and physically coupling the second lens edge to a fourth part of the WHUD frame.

12. The method of claim 11 wherein edging a lens blank to form an eyeglass lens includes applying at least one temporary fiducial mark to the lens blank.

13. The method of claim 12 wherein applying at least one temporary fiducial mark to the lens blank includes laser-etching the lens blank.

14. The method of claim 13 wherein applying at least on temporary fiducial mark to the lens blank includes printing at least one fiducial mark onto the lens blank.

15. The method of 14, further comprising determining at least one fiducial offset for the at least one fiducial mark.

16. The method of claim 15 wherein determining at least one fiducial offset includes measuring a playback of the DOE.

17. The method of claim 11 wherein edging the lens blank to form an eyeglass lens includes edging the lens blank to align an optical center of the eyeglass lens with the second part of the WHUD frame.

18. The method of claim 17 wherein edging the lens blank to align an optical center of the eyeglass lens with the second part of the WHUD frame includes aligning the eyeglass lens in the Z direction.

19. A wearable heads-up display ("WHUD") comprising:

a support structure;

a projector carried by the support structure; and a transparent combiner positioned and oriented with respect to the support structure to appear in a field of view of an eye of a user when the support structure is worn on a head of the user, the transparent combiner comprising:

a lens carried by the support structure; and a diffractive optical element ("DOE") positioned within the lens to align the DOE with the eye of the user when the support structure is worn on the head of the user, wherein a distance between the projector and the DOE is equal to a measurement of an outer pupillary distance ("OPD") that is a vector distance between the projector and the eye of the user.

* * * * *

UNITED STATES PATENT AND TRADEMARK OFFICE
CERTIFICATE OF CORRECTION

PATENT NO. : 11,099,394 B2
APPLICATION NO. : 16/742467
DATED : August 24, 2021
INVENTOR(S) : Arnett Weber and Darren Ihmels It is certified that error appears in the above-identified patent and that said Letters Patent is hereby corrected as shown below:

In the Claims

Column 22 Line 28, Claim 14 replace "on" with "one" at the end of the line after least Signed and Sealed this
Seventh Day of March, 2023

Katherine Kelly Vidal
*Director of the United States Patent and Trademark Office*